(12) United States Patent
Takimoto

(10) Patent No.: US 11,293,825 B2
(45) Date of Patent: Apr. 5, 2022

(54) PRESSURE SENSOR WITH IMPROVED SEALING

(71) Applicant: Saginomiya Seisakusho, Inc., Tokyo (JP)

(72) Inventor: Kazuya Takimoto, Sayama (JP)

(73) Assignee: SAGINOMIYA SEISAKUSHO, INC., Tokyo (JP)

( * ) Notice: Subject to any disclaimer, the term of this patent is extended or adjusted under 35 U.S.C. 154(b) by 128 days.

(21) Appl. No.: 16/760,788

(22) PCT Filed: Oct. 10, 2018

(86) PCT No.: PCT/JP2018/037815
§ 371 (c)(1),
(2) Date: Apr. 30, 2020

(87) PCT Pub. No.: WO2019/093054
PCT Pub. Date: May 16, 2019

(65) Prior Publication Data
US 2020/0326255 A1  Oct. 15, 2020

(30) Foreign Application Priority Data
Nov. 13, 2017 (JP) .............................. JP2017-218303

(51) Int. Cl.
*G01L 9/00* (2006.01)
*G01L 19/06* (2006.01)
*G01L 19/00* (2006.01)

(52) U.S. Cl.
CPC ........ *G01L 19/0672* (2013.01); *G01L 9/0072* (2013.01); *G01L 19/0084* (2013.01)

(58) Field of Classification Search
None
See application file for complete search history.

(56) References Cited

FOREIGN PATENT DOCUMENTS

| CN | 103487204 A | 1/2014 |
|---|---|---|
| CN | 103487205 A | 1/2014 |
| CN | 204007945 U | 12/2014 |
| JP | H06-129928 A | 5/1994 |
| JP | 2012-068105 A | 4/2012 |
| JP | 2014-016334 A | 1/2014 |

(Continued)

OTHER PUBLICATIONS

Chinese Office Action, English Translation, from CN201880071809. X, dated Mar. 26, 2021.

(Continued)

*Primary Examiner* — Lisa M Caputo
*Assistant Examiner* — Nigel H Plumb
(74) *Attorney, Agent, or Firm* — Workman Nydegger

(57) ABSTRACT

The present invention aims to provide a pressure sensor capable of improving waterproofness and airtightness by using a sealing adhesive without the use of an atmosphere-side O-ring or packing and improving workability by filling the sealing adhesive in one direction. In the pressure sensor, a protective cover is formed by any combination of a joint, a lower cover, a pressure detection unit, and a case portion. The protective cover includes a side wall forming an outer periphery and a bottom on the pressure chamber side of the side wall. An opening on a side of the protective cover opposite to the bottom is filled with the sealing adhesive to maintain waterproofness and airtightness of a signal transmission unit.

2 Claims, 10 Drawing Sheets

(56) References Cited

FOREIGN PATENT DOCUMENTS

| JP | 2016-045172 A | 4/2016 |
|---|---|---|
| KR | 20130139763 A | 12/2013 |

OTHER PUBLICATIONS

Extended European Search Report dated Jul. 19, 2021 for EP18876444.3 filed Oct. 10, 2018.
International Preliminary Report on Patentability dated May 19, 2020, issued in PCT Application No. PCT/JP2018/037815, filed Oct. 10, 2018.

PRESSURE SENSOR WITH IMPROVED SEALING

TECHNICAL FIELD

The present invention relates to a pressure sensor, particularly a pressure sensor required to have waterproofness and airtightness.

BACKGROUND ART

As a pressure sensor for fluid pressure detection, a pressure sensor required to have waterproofness and airtightness such as a refrigerant pressure sensor for frozen storage, cold storage, and air conditioning has been conventionally known.

As this kind of pressure sensor, an oil-filled pressure sensor 900 shown in FIG. 9 and a capacitive pressure sensor 1000 shown in FIG. 10 have been conventionally known. These conventional pressure sensors 900 and 1000 will be described.

In FIG. 9, the conventional oil-filled pressure sensor 900 comprises a pressure introducing unit 910, a pressure detection unit 920, and a signal transmission unit 930.

The pressure introducing unit 910 comprises a joint 911 being connected to piping for introducing fluid to be pressure-detected such as refrigerant, a lower cover 912 which is cup-shaped and is connected to the joint 911, and a pressure chamber 913 defined by the joint 911, the lower cover 912, and a diaphragm 923 to be described later.

The pressure detection unit 920 mainly comprises a semiconductor sensor chip 921, a liquid seal chamber 922, the diaphragm 923, and a metal housing 924. In the pressure detection unit 920, pressure of fluid such as refrigerant introduced from the piping into the pressure chamber 913 via the joint 911 is detected by the semiconductor sensor chip 921 via the diaphragm 923 and the liquid seal chamber 922. Since the pressure detection unit 920 is well known to one skilled in the art, detailed description thereof is omitted.

The signal transmission unit 930 comprises a connection substrate 931 electrically connected to the semiconductor sensor chip 921, a connector member, contact pin, etc. 932 connected to the connection substrate 931, a body 933 insulating and holding the connection substrate 931 and the contact pin, etc. 932, a spacer 934 ensuring insulation between the pressure detection unit 920 and the connection substrate 931, a case 935 fixing the outer periphery of the pressure detection unit 920 and the body 933, and an atmosphere-side O-ring 936 sandwiched between the body 933 and the case 935 to ensure waterproofness.

Next, in FIG. 10, the conventional capacitive pressure sensor 1000 comprises a pressure introducing unit 1010, a pressure detection unit 1020, and a signal transmission unit 1030.

The pressure introducing unit 1010 comprises a protective cover 1011, an O-ring 1012 receiving pressure of fluid such as refrigerant, and a pressure chamber 1013. The protective cover 1011 is molded integrally to have a joint portion 1011a, a pressure chamber recessed portion 1011b, a case portion 1011c, and a swaging portion 1011d. However, the protective cover 1011 is not limited to this and may be formed by molding the joint portion 1011a, the pressure chamber recessed portion 1011b, and the case portion 1011c separately or in combination and connecting them with an adhesive or by welding. The pressure chamber 1013 is formed between a sensor element 1021 to be described later and the pressure chamber recessed portion 1011b of the protective cover 1011.

The pressure detection unit 1020 comprises a capacitive sensor element 1021 and a spacer 1022 which is formed of an insulating material and arranged in the case portion 1011c of the protective cover 1011. In the sensor element 1021, pressure of fluid such as refrigerant introduced into the pressure chamber 1013 is read as a change in capacitance between electrodes caused by variations in the electrodes and is transmitted externally as a pressure signal. The sensor element 1021 mainly comprises two electrodes, an insulator arranged between the two electrodes, a lead wire connected to the two electrodes, an adhesive, and a member ensuring a gap between the electrodes. Since the sensor element 1021 is well known to one skilled in the art, detailed description thereof is omitted.

The signal transmission unit 1030 comprises a connection substrate 1031 electrically connected to the sensor element 1021, a connector member, contact pin, etc. 1032 connected to the connection substrate 1031, a body 1033 insulating and holding the connection substrate 1031 and the contact pin, etc. 1032, and an atmosphere-side O-ring 1036 sandwiched between the body 1033 and the case 1011c of the protective cover 1011 to ensure waterproofness.

In the conventional pressure sensors 900 and 1000, the atmosphere-side O-rings 936 and 1036 or other types of packing are used as described above to achieve waterproofness and airtightness. However, the airtight structure formed by the O-ring or packing has a problem that the material for the O-ring or packing is shrunk/expanded by repetition of underwater heat shock and freezing/thawing and a gap is thus generated, which allows the entry of water and causes a malfunction.

CITATION LIST

Patent Literature

PTL 1: Japanese Patent Laid-Open No. 2012-68105
PTL 2: Japanese Patent Laid-Open No. 2014-16334
PTL 3: Japanese Patent Laid-Open No. H06-129928

SUMMARY OF INVENTION

Technical Problem

To solve the above problem, PTL 1 discloses an invention wherein openings of a pressure sensor are filled with a first adhesive and a second adhesive to maintain high airtightness without using an atmosphere-side O-ring or packing. However, since the orientation of the opening filled with the first adhesive is opposite to that of the opening filled with the second adhesive, there is a problem in workability.

Therefore, the present invention aims to provide a pressure sensor capable of improving waterproofness and airtightness by using a sealing adhesive without the use of an atmosphere-side O-ring or packing and improving workability by filling the sealing adhesive in one direction.

Solution to Problem

To solve the above problem, a pressure sensor of the present invention comprises: a joint portion comprising a pressure chamber and a flow path into which fluid is introduced from piping; a pressure detection unit configured to detect pressure of the fluid introduced into the pressure chamber; a case which has a cylindrical shape and is arranged on a side of the pressure detection unit opposite to the pressure chamber; and a signal transmission unit which is arranged inside the case and comprises a cable configured to externally transmit a pressure signal, wherein a protective cover is formed by any combination of the joint portion, the pressure detection unit, and the case, the protective cover comprising a side wall forming an outer periphery, a bottom on a pressure chamber side of the side wall, and an opening on a side opposite to the bottom, and the opening of the protective cover is filled with a sealing adhesive.

The pressure detection unit may include a metal housing, the case may be formed of a metal material, the housing and the case may be substantially equal in outer diameter, and the housing of the pressure detection unit and the case may be connected to each other by welding.

A straight structure may be formed at an end of the opening of the protective cover.

A narrowed portion in which a side surface is narrowed inward may be formed at the end of the opening of the protective cover.

A widened portion in which the side surface is widened outward may be formed at the end of the opening of the protective cover.

The joint portion and the case of the protective cover may be integrally molded from a metal material.

A swaging spacer formed into an annular shape having an opening at a center may be further provided inside the case, and a swaging portion bent inward and fixed to the swaging spacer may be formed at an end of the case forming the protective cover on a side of an inlet of the sealing adhesive.

The signal transmission unit may be connected to the pressure detection unit via a connector or a solder joint.

Advantageous Effects of Invention

According to the pressure sensor of the present invention, waterproofness and airtightness can be improved by using a sealing adhesive without the use of an atmosphere-side O-ring or packing and workability can be improved by filling the adhesive in one direction.

DESCRIPTION OF EMBODIMENTS

Figure 1:
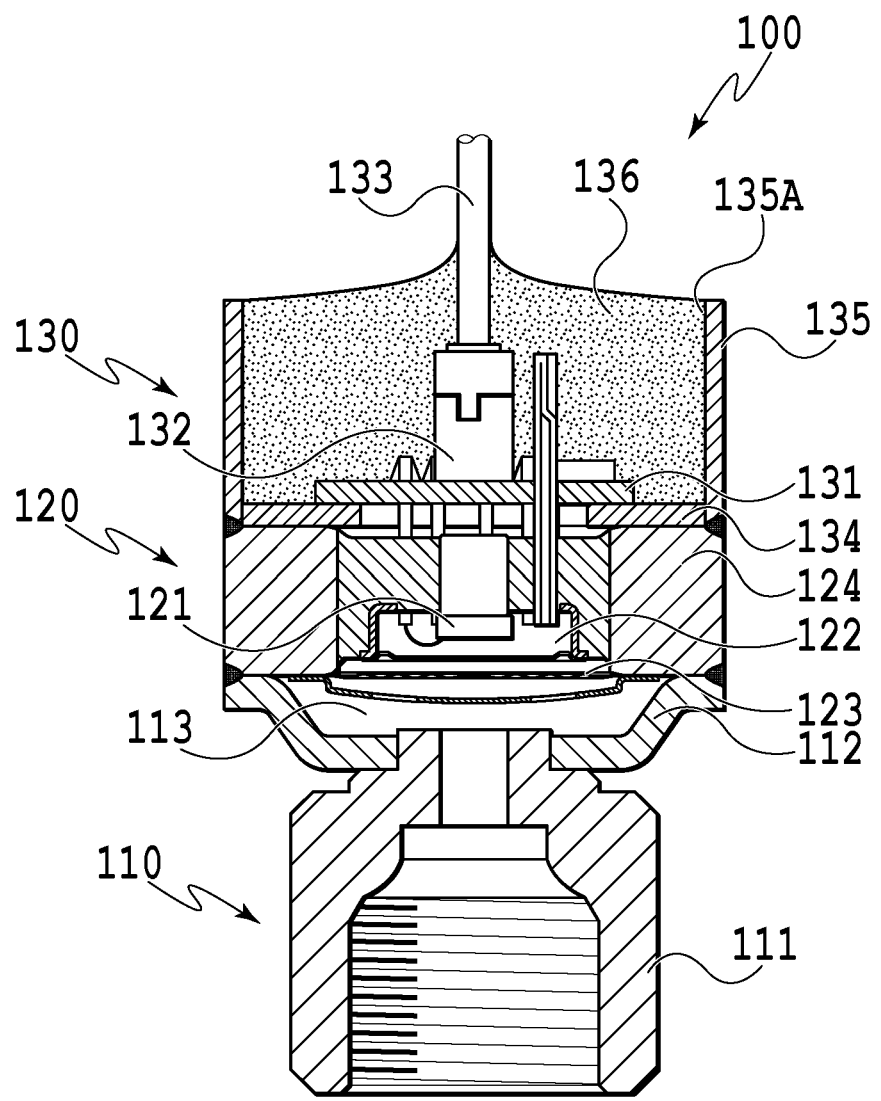
FIG. 1 is a longitudinal sectional view showing an oil-filled pressure sensor as a pressure sensor of a first embodiment of the present invention.

Embodiments of the present invention will be described with reference to the drawings.

It should be noted that up/down and left/right in the following description correspond to those in the drawings and show a relative positional relationship between members, not an absolute positional relationship.

First, the first embodiment of the present invention will be described.

FIG. 1 is a longitudinal sectional view showing an oil-filled pressure sensor 100 as a pressure sensor of the first embodiment of the present invention.

In FIG. 1, the pressure sensor 100 comprises a pressure introducing unit 110, a pressure detection unit 120, and a signal transmission unit 130.

The pressure introducing unit 110 comprises a joint 111, which is connected to piping to introduce fluid to be pressure-detected such as refrigerant and is formed of a metal material such as brass, a lower cover 112, which is connected to the joint 111, is cup-shaped, and is formed of a metal material such as stainless steel, and a pressure chamber 113 defined by the joint 111, the lower cover 112, and a diaphragm 123 to be described later. In the present embodiment, the lower cover 112 should preferably be connected to a metal housing 124 of the pressure detection unit 120 to be described later by welding or the like, but is not limited to this. A joint portion includes the joint 111 and the lower cover 112.

The pressure detection unit 120 mainly comprises a semiconductor sensor chip 121, a liquid seal chamber 122 filled with oil or the like, a diaphragm 123 defining the above-described pressure chamber 113, and the metal housing 124. In the pressure detection unit 120, pressure of fluid such as refrigerant introduced into the pressure chamber 113 is detected by the semiconductor sensor chip 121 arranged in the liquid seal chamber 122 filled with oil or the like via the diaphragm 123. Since the detailed operation of the pressure detection unit 120 of the oil-filled pressure sensor 100 is well known to one skilled in the art as disclosed in PTL 2 for example, detailed description thereof is omitted.

The signal transmission unit 130 comprises a connection substrate 131, an electric connector 132, a cable 133, a spacer 134, a case 135, and a sealing adhesive 136.

The connection substrate 131 is electrically connected to the semiconductor sensor chip 121 of the pressure detection unit 120 by a lead pin, wire bonding, or the like to externally transmit a pressure detection signal via the electric connector 132 and the cable 133. The connection substrate 131 does not necessarily have to be prepared separately and may be embedded in the semiconductor sensor chip 121.

The electric connector 132 includes a receptacle which is mounted on the connection substrate 131 and a plug which is connected to the cable 133 and arranged so as to be inserted into and removed from the receptacle.

Three cables 133 (VCC, GND, VOUT) are drawn out from the connection substrate 131 to externally transmit the pressure detection signal detected by the semiconductor sensor chip 121.

The spacer 134 is formed of an insulating material such as resin and is arranged between the pressure detection unit 120 and the connection substrate 131 to ensure insulation of the connection substrate 131 and the like.

The case 135 has a cylindrical shape and is arranged on the side of the pressure detection unit 120 opposite to the pressure chamber 113. The case 135 should preferably be formed of a metal material and welded to the metal housing 124. As the material, it is particularly preferable to use brass, copper, or iron-nickel alloy having good adhesion to the sealing adhesive 136 to be described later. As the material for the case 135, an insulating material such as a resin material may also be used such that the case 135 is fixed to the pressure detection unit 120 by different means such as an adhesive. The case 135 and the pressure detection unit 120 form a protective cover having a side wall forming an outer periphery, a bottom on the pressure chamber side of the side wall, and an opening 135A on the side opposite to the bottom.

Alternatively, projections may be formed on the entire periphery of the welded portions to ensure welding of the case 135 and the metal housing 124 and welding of the metal housing 124 and the lower cover 112. Although it is preferable that the case 135 be identical in outside diameter to the metal housing 124 to ensure the welding, a step is allowable to some extent provided that the adjacent members can be welded in the lateral direction. A conventional pressure sensor such as a pressure sensor disclosed in PTL 2 requires the process of putting a case after welding a housing and a lower cap. In this case, welding from the joint side has a problem that a welding torch does not reach the welded portion due to the shape of the joint, which makes it difficult to uniformly weld the entire periphery. Welding from the side surface also has a problem that penetration is insufficient to fuse the lower cap through the case and resist high pressure, with the result that airtightness cannot be ensured. These problems in the conventional technique can be solved by the structure of the present invention described above.

The sealing adhesive 136 is filled from the upper opening 135A of the case 135 shown in FIG. 1. Since the sealing adhesive 136 is filled in one direction, workability can be improved while maintaining waterproofness and airtightness. As the material for the sealing adhesive 136, a silicone, epoxy, urethane, fluorine, or acrylic adhesive can be used. In the present embodiment, the end of the opening 135A of the case 135 is straight and the sealing adhesive 136 is filled in such an amount as to maintain waterproofness/airtightness, preferably up to the end of the opening 135A.

Figure 5:
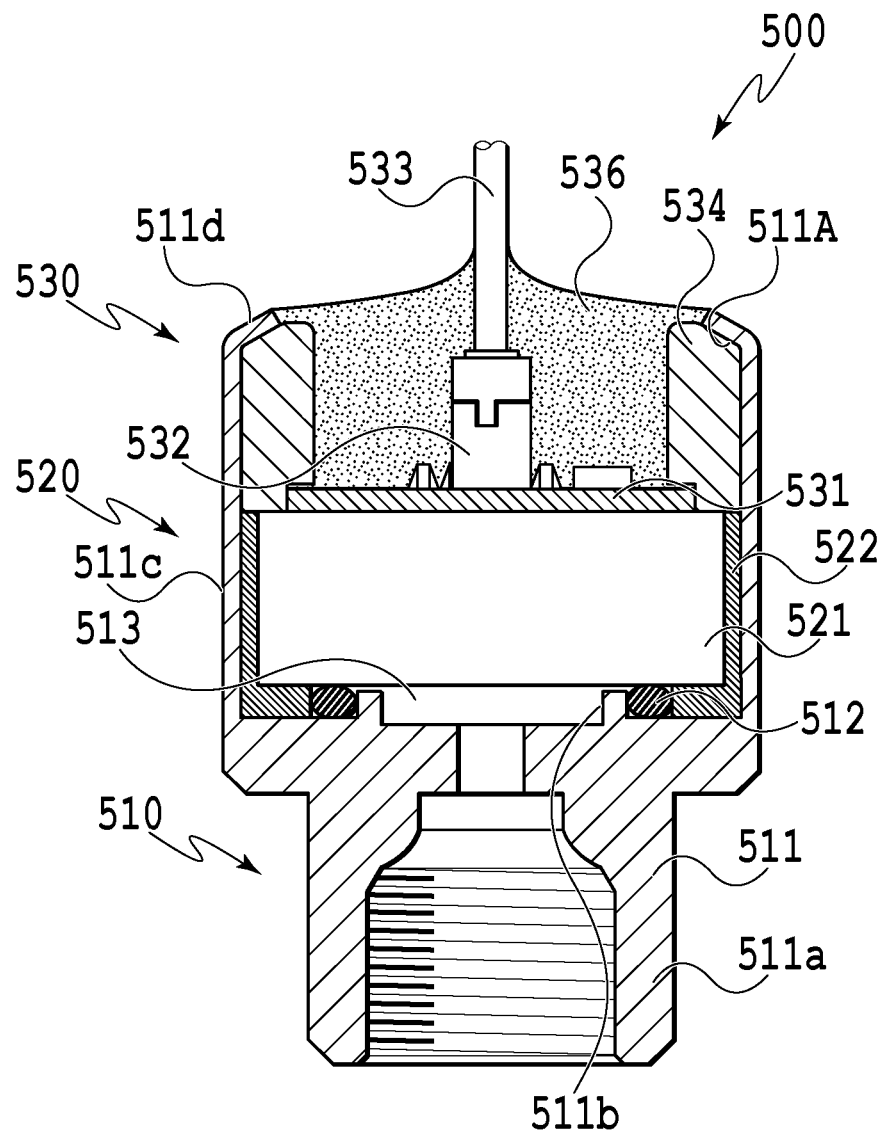
FIG. 5 is a longitudinal sectional view showing a capacitive pressure sensor as a pressure sensor of a fifth embodiment of the present invention.

In the present embodiment, the joint 111, the lower cover 112, the housing 124 of the pressure detection unit 120, and the case 135 are prepared separately as components forming the exterior and are integrated by welding or the like. However, the present invention is not limited to this. For example, as shown in FIG. 5 to be described later, it is possible to use a protective cover 511 molded integrally from a metal material such as brass to have the shapes of all the above components.

As described above, according to the pressure sensor 100 of the first embodiment of the present invention, waterproofness and airtightness can be improved by using the sealing adhesive 136 without the use of an O-ring or packing and workability can be improved by filling the sealing adhesive 136 only from the opening 135A of the protective cover formed by the case 135 and the pressure detection unit 120 and comprising the side wall forming the outer periphery and the bottom on the pressure chamber side of the side wall.

Further, the process of putting a case after welding the housing and the lower cap is omitted and welding can be performed from the side surface, whereby simplifying a welding device, shortening a time required for the welding process, stabilizing airtightness of the welded portion, and improving workability.

Next, the second embodiment of the present invention will be described.

Figure 2:
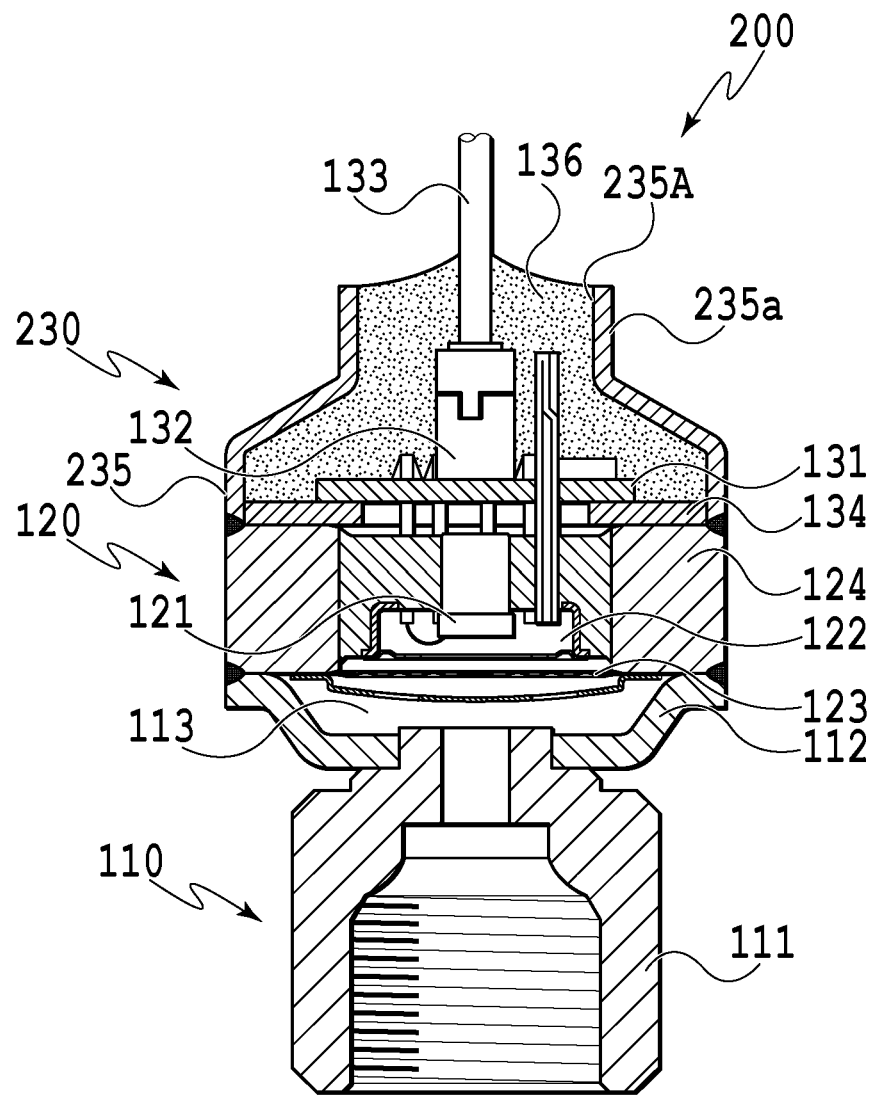
FIG. 2 is a longitudinal sectional view showing an oil-filled pressure sensor as a pressure sensor of a second embodiment of the present invention.

FIG. 2 is a longitudinal sectional view showing an oil-filled pressure sensor 200 as a pressure sensor of the second embodiment of the present invention.

In FIG. 2, the pressure sensor 200 is identical to the pressure sensor 100 shown in FIG. 1 except that a narrowed portion 235a in which the side surface is narrowed inward is formed at the upper end of a case 235 of a signal transmission unit 230 shown in FIG. 2. The shape of the narrowed portion 235a is not limited to a cylindrical shape and may be a different shape such as a quadrangular prism or an elliptic cylinder. The same reference signs are assigned to the same components and description of the components is omitted.

As described above, according to the pressure sensor 200 of the second embodiment of the present invention, the same advantageous effect as the pressure sensor 100 of the first embodiment can be produced. In addition, the amount of the sealing adhesive 136 filled in the case 235 can be reduced.

Next, the third embodiment of the present invention will be described.

Figure 3:
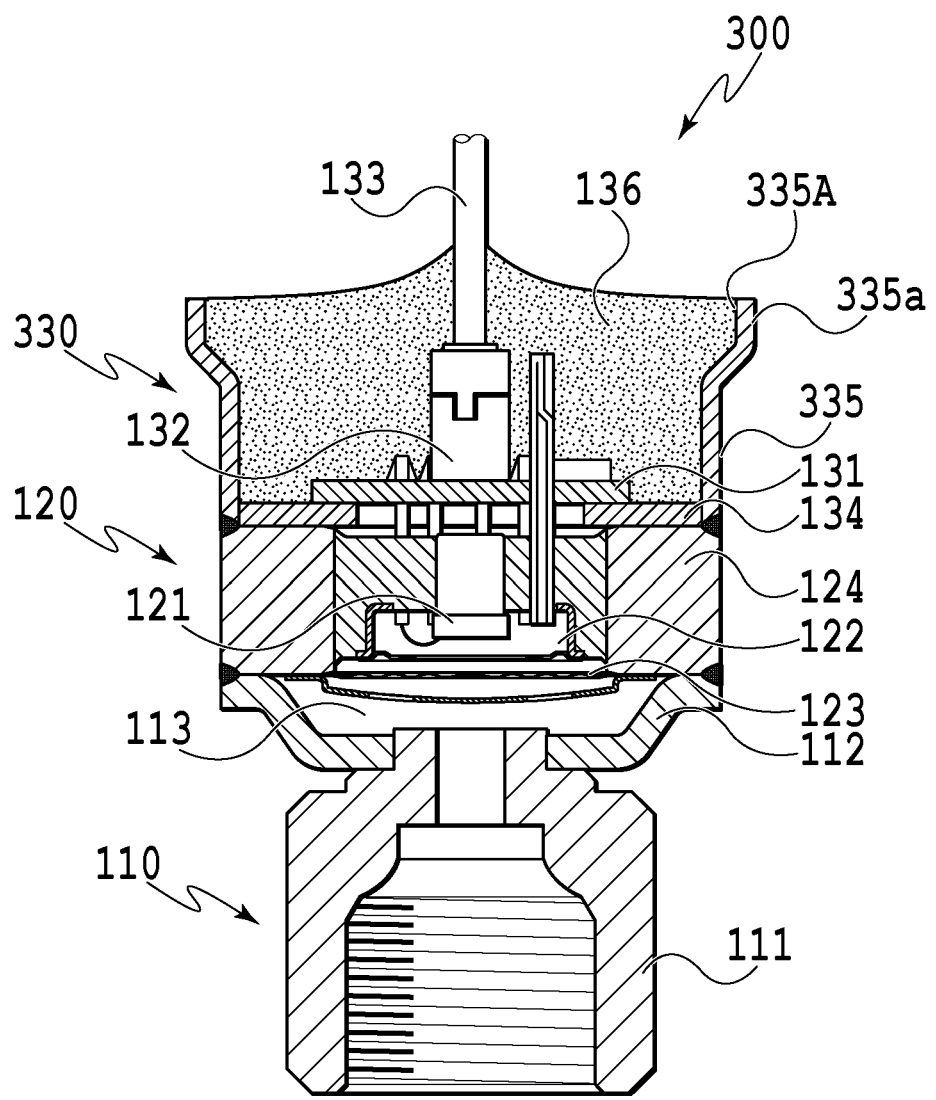
FIG. 3 is a longitudinal sectional view showing an oil-filled pressure sensor as a pressure sensor of a third embodiment of the present invention.

FIG. 3 is a longitudinal sectional view showing an oil-filled pressure sensor 300 as a pressure sensor of the third embodiment of the present invention.

In FIG. 3, the pressure sensor 300 is identical to the pressure sensor 100 shown in FIG. 1 except that a widened portion 335a in which the side surface is widened outward is formed at the upper end of a case 335 of a signal transmission unit 330 shown in FIG. 3. The shape of the widened portion 335a is not limited to a cylindrical shape and may be a different shape such as a quadrangular prism or an elliptic cylinder. Further, the widened portion 335a may have one or more projections so as to catch the cable. The same reference signs are assigned to the same components and description of the components is omitted.

As described above, according to the pressure sensor 300 of the third embodiment of the present invention, the same advantageous effect as the pressure sensor 100 of the first embodiment can be produced. In addition, the attachability of a tie or the like to the case 335 can be improved.

Next, the fourth embodiment of the present invention will be described.

Figure 4:
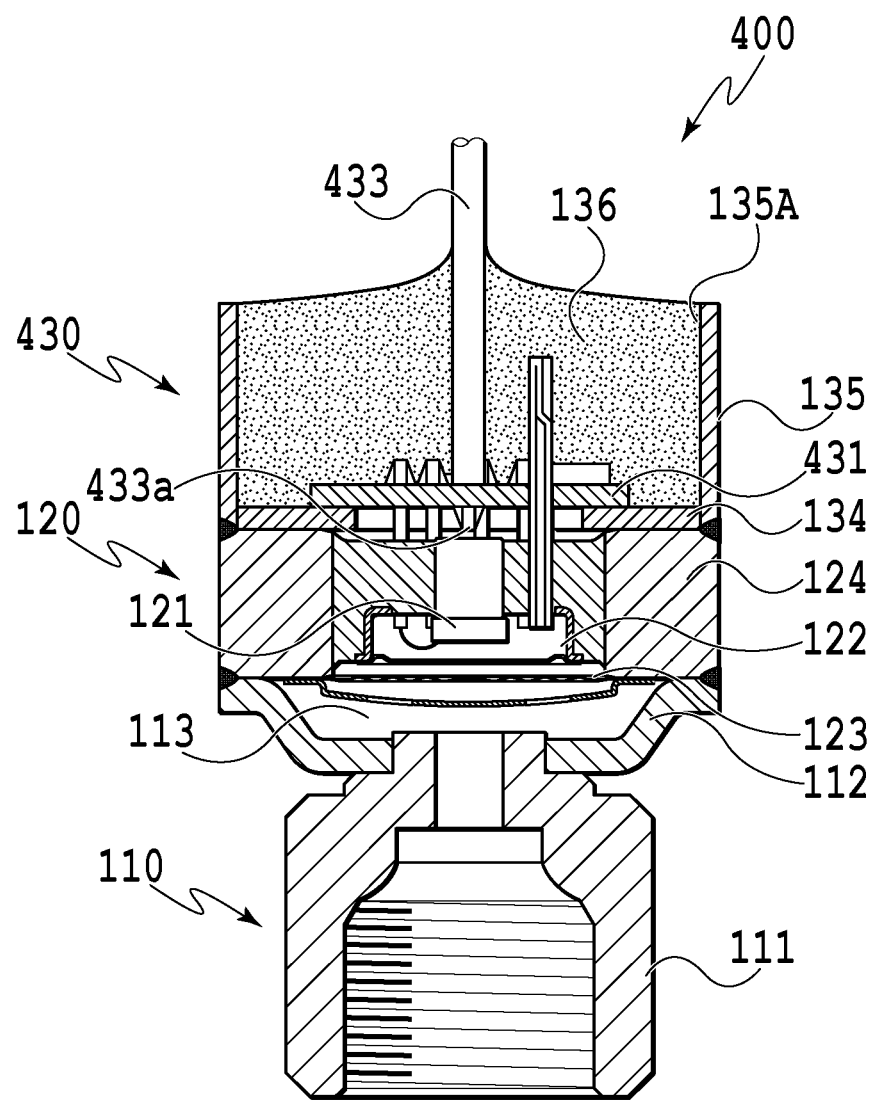
FIG. 4 is a longitudinal sectional view showing an oil-filled pressure sensor as a pressure sensor of a fourth embodiment of the present invention.

FIG. 4 is a longitudinal sectional view showing an oil-filled pressure sensor 400 as a pressure sensor of the fourth embodiment of the present invention.

In FIG. 4, the pressure sensor 400 is identical to the pressure sensor 100 shown in FIG. 1 except that a cable 433 is soldered to a connection substrate 431 of a signal transmission unit 430 via a solder joint 433a. The same reference signs are assigned to the same components and description of the components is omitted.

As described above, according to the pressure sensor 400 of the fourth embodiment of the present invention, the same advantageous effect as the pressure sensor 100 of the first embodiment can be produced. In addition, the electric connector 132 can be omitted and cost reduction can be achieved.

Next, the fifth embodiment of the present invention will be described.

FIG. 5 is a longitudinal sectional view showing a capacitive pressure sensor 500 as a pressure sensor of the fifth embodiment of the present invention.

In FIG. 5, the pressure sensor 500 comprises a pressure introducing unit 510, a pressure detection unit 520, and a signal transmission unit 530.

The pressure introducing unit 510 comprises a protective cover 511, an O-ring 512, and a pressure chamber 513. In the present embodiment, the protective cover 511 is molded integrally from a metal material such as brass to have a joint portion 511a, a pressure chamber recessed portion 511b, a case portion 511c, and a swaging portion 511d. However, the protective cover 511 is not limited to this and may be formed by molding the joint portion 511a, a lower cover portion corresponding to the pressure chamber recessed portion 511b, and the case portion 511c separately or in combination and connecting them with an adhesive or by welding. In the present embodiment, the pressure chamber 513 is formed between a sensor element 521 to be described later and the pressure chamber recessed portion 511b of the protective cover 511. Since the O-ring 512 is used for sealing refrigerant or the like, there arises no conventional problem such as repetition of underwater heat shock and freezing/thawing.

The pressure detection unit 520 comprises a capacitive sensor element 521 and an insulating spacer 522 formed of an insulating material and inserted into the case portion 511c of the protective cover 511 to hold the O-ring 512. In the sensor element 521, pressure of fluid such as refrigerant introduced into the pressure chamber 513 is read as a change in capacitance between electrodes caused by variations in the electrodes and is transmitted externally as a pressure signal. The sensor element 521 mainly comprises two electrodes, an insulator arranged between the two electrodes, a lead wire connected to the two electrodes, an adhesive, and a member ensuring a gap between the electrodes. Since the detailed operation of the pressure detection unit 520 of the capacitive pressure sensor 500 is well known to one skilled in the art as disclosed in PTL 3 for example, detailed description thereof is omitted.

The signal transmission unit 530 comprises a connection substrate 531, an electric connector 532, a cable 533, a swaging spacer 534, and a sealing adhesive 536.

The connection substrate 531 is electrically connected to the sensor element 521 of the pressure detection unit 520 via the lead wire or the like to externally transmit a pressure detection signal via the electric connector 532 and the cable 533.

The electric connector 532 comprises a receptacle which is mounted on the connection substrate 531 and a plug which is connected to the cable 533 and arranged so as to be inserted into and removed from the receptacle.

In the present embodiment, three cables 533 (VCC, GND, VOUT) are drawn out from the connection substrate 531 to externally transmit the pressure detection signal detected by the sensor element 521.

The swaging spacer 534 is arranged inside the case portion 511c of the protective cover 511 and is formed of an insulating material such as resin to have an annular shape with an opening at the center. A swaging portion 511d bent inward is formed at the upper end of the case portion 511c of the protective cover 511 shown in FIG. 5 and is fixed to the swaging spacer 534. The swaging of the swaging portion 511d fixes the insulating spacer 522 and the sensor element 521 and ensures the sealing ability of the O-ring 512.

The sealing adhesive 536 is filled from the upper opening 511A of the protective cover 511 shown in FIG. 5. Since the sealing adhesive 536 is filled in one direction, workability can be improved while maintaining waterproofness and airtightness. As the material for the sealing adhesive 536, a silicone, epoxy, urethane, fluorine, or acrylic adhesive can be used.

The present embodiment uses the protective cover 511 having the joint portion 511a, the pressure chamber recessed portion 511b, the case portion 511c, and the swaging portion 511d and molded integrally from a metal material such as brass. However, the protective cover 511 is not limited to this. As shown in FIG. 1, all the members may be formed separately and integrated by welding or the like.

As described above, according to the pressure sensor 500 of the fifth embodiment of the present invention, waterproofness and airtightness can be improved by using the sealing adhesive 536 without the use of an atmosphere-side O-ring or packing and workability can be improved by filling the sealing adhesive 536 only from the opening 511A of the protective cover 511 formed by the joint portion 511a and the case portion 511c and comprising the side wall forming the outer periphery and the bottom on the pressure chamber side of the side wall.

Next, the sixth embodiment of the present invention will be described.

Figure 6:
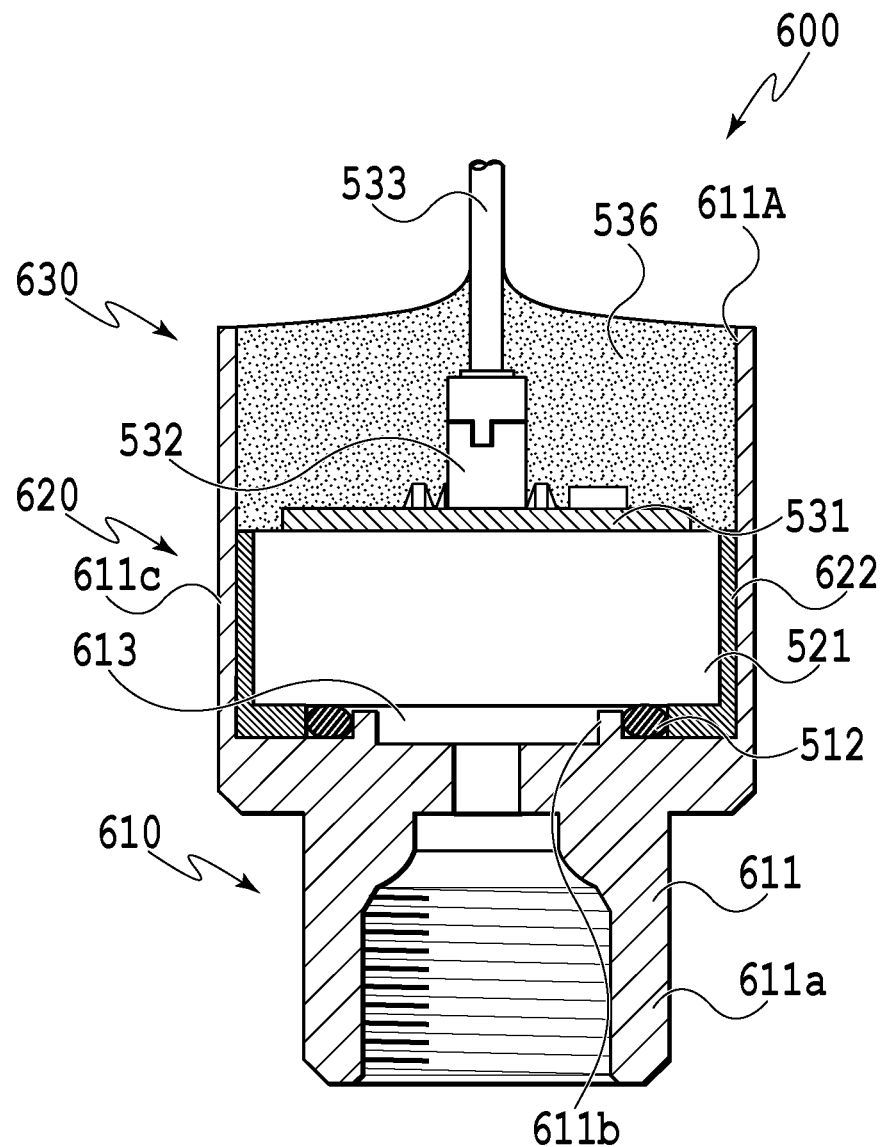
FIG. 6 is a longitudinal sectional view showing a capacitive pressure sensor as a pressure sensor of a sixth embodiment of the present invention.

FIG. 6 is a longitudinal sectional view showing a capacitive pressure sensor 600 as a pressure sensor of the sixth embodiment of the present invention.

In FIG. 6, the pressure sensor 600 is identical to the pressure sensor 500 shown in FIG. 5 except that the swaging spacer 534 is not provided inside a case portion 611b of a protective cover 611 and the swaging portion is also not formed in a protective cover 611. The same reference signs are assigned to the same components and description of the components is omitted.

A capacitive pressure detection unit 620 comprises the capacitive sensor element 521 and an insulating spacer 622 which is formed of an insulating material and is press-fitted in a case portion 611c of the protective cover 611 to hold the O-ring 512. Since the insulating spacer 622 of the present embodiment is not fixed by the swaging spacer 534 and the swaging portion 511d of the protective cover 511 unlike the embodiment shown in FIG. 5, the insulating spacer 622 is fixed by press fitting.

As described above, according to the pressure sensor 600 of the sixth embodiment of the present invention, the same advantageous effect as the pressure sensor 500 of the fifth embodiment can be produced. In addition, the swaging spacer 534 can be omitted by press-fitting the insulating spacer 622 in the case portion 611c of the protective cover 611 and cost reduction can be achieved.

Next, the seventh embodiment of the present invention will be described.

Figure 7:
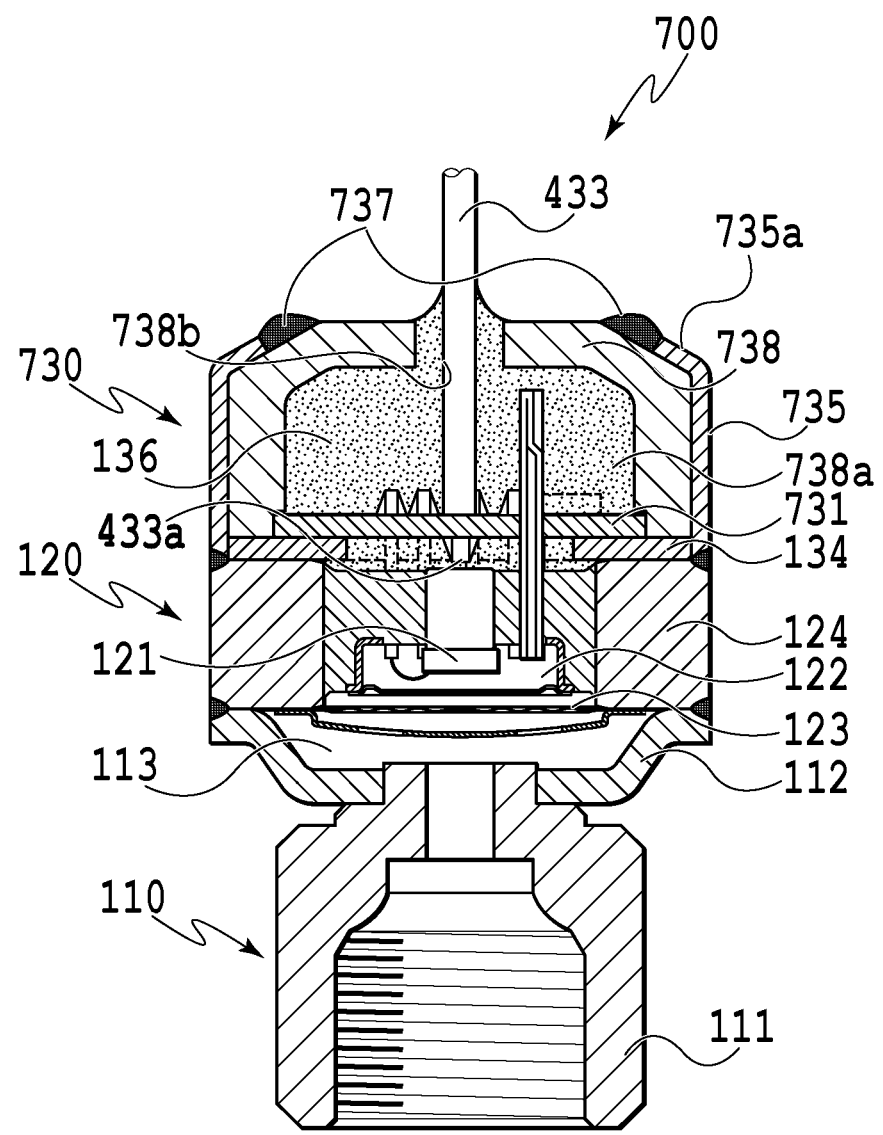
FIG. 7 is a longitudinal sectional view showing an oil-filled pressure sensor as a pressure sensor of a seventh embodiment of the present invention.

FIG. 7 is a longitudinal sectional view showing an oil-filled pressure sensor 700 as a pressure sensor of the seventh embodiment of the present invention.

In FIG. 7, the pressure sensor 700 is identical to the pressure sensor 400 shown in FIG. 4 except that an inner cap 738 is provided inside a case 735 and filled with the sealing adhesive 136. The same reference signs are assigned to the same components and description of the components is omitted.

The inner cap 738 is arranged inside the case 135 and is formed of an insulating material such as resin. The inner cap 738 has an inner cavity 738a formed on the pressure detection unit 120 side and an opening 738b formed between the inner cavity 738a and the outside. In the inner cavity 738a, there are provided conductive energized components such as the cable 433 of a signal transmission unit 730 and a connection substrate 731. The cable 433 of the signal transmission unit 730 is arranged to pass through the opening 738b. Although the inner cap 738 is fixed to a swaging portion 735a of the case 735 by swaging as shown in FIG. 7, the shape and fixing method are not limited to this.

The inner cavity 738a and the opening 738b of the inner cap 738 are filled with the sealing adhesive 136. Further, a sealing adhesive 737 is filled over the entire periphery between the outer periphery of the inner cap 738 and the inner periphery of the swaging portion 735a of the case 735 to maintain waterproofness. The material for the sealing adhesive 737 may be the same as or different from the material for the sealing adhesive 136 provided inside the inner cap 738.

As described above, according to the pressure sensor 700 of the seventh embodiment of the present invention, the same advantageous effect as the pressure sensor 400 of the fourth embodiment can be produced. In addition, waterproofness can be further improved by providing the inner cap 738 and filling the inner cap 738 with the sealing adhesive 136.

Next, the eighth embodiment of the present invention will be described.

Figure 8:
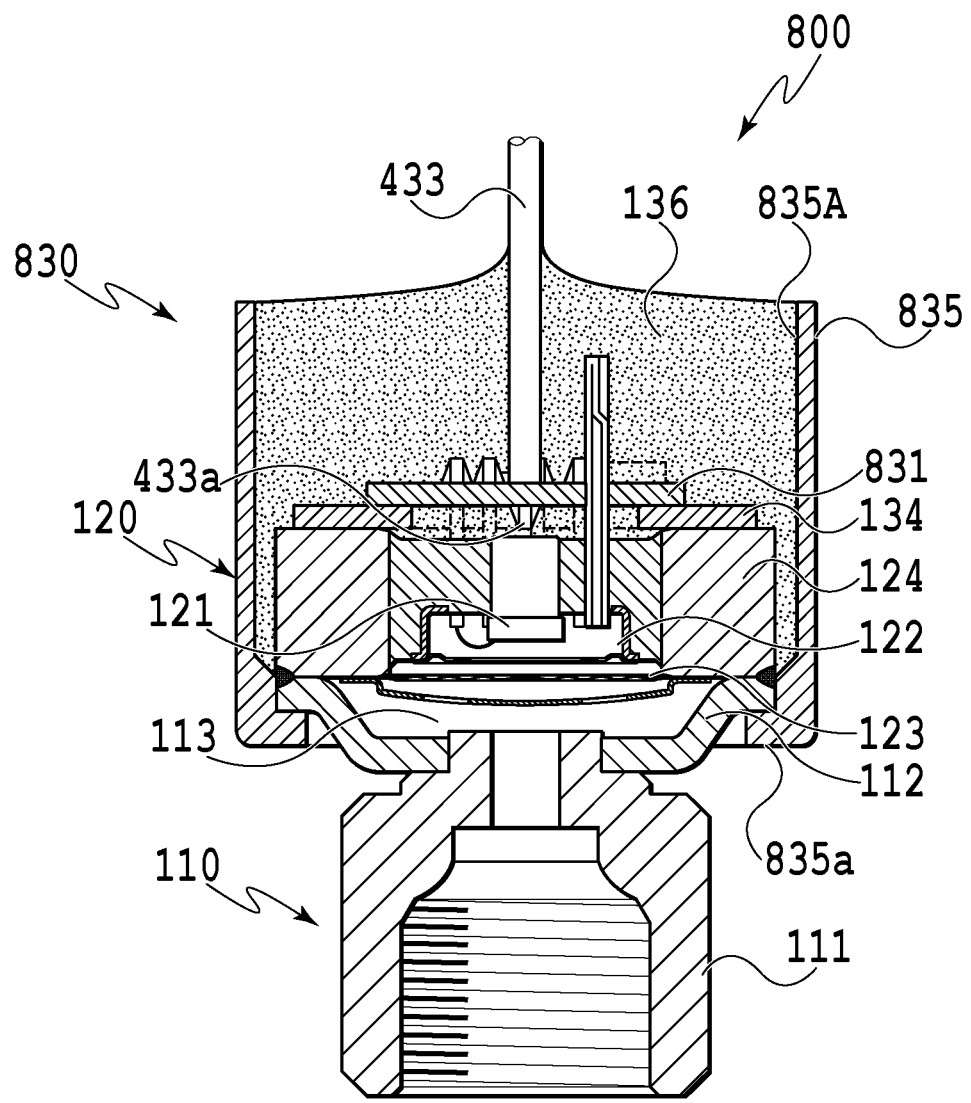
FIG. 8 is a longitudinal sectional view showing an oil-filled pressure sensor as a pressure sensor of an eighth embodiment of the present invention.
Figure 9:
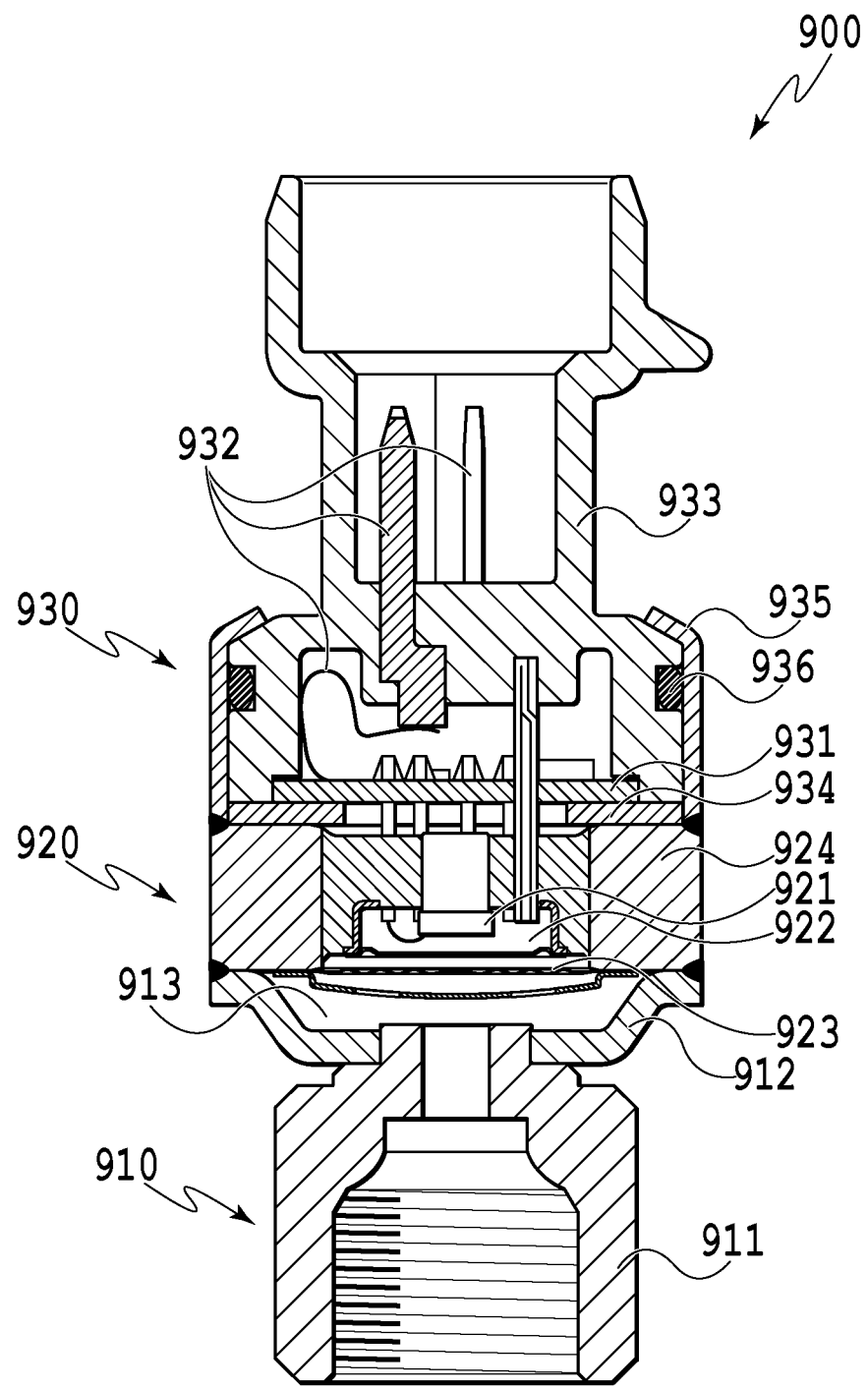
FIG. 9 is a longitudinal sectional view showing a conventional oil-filled pressure sensor.
Figure 10:
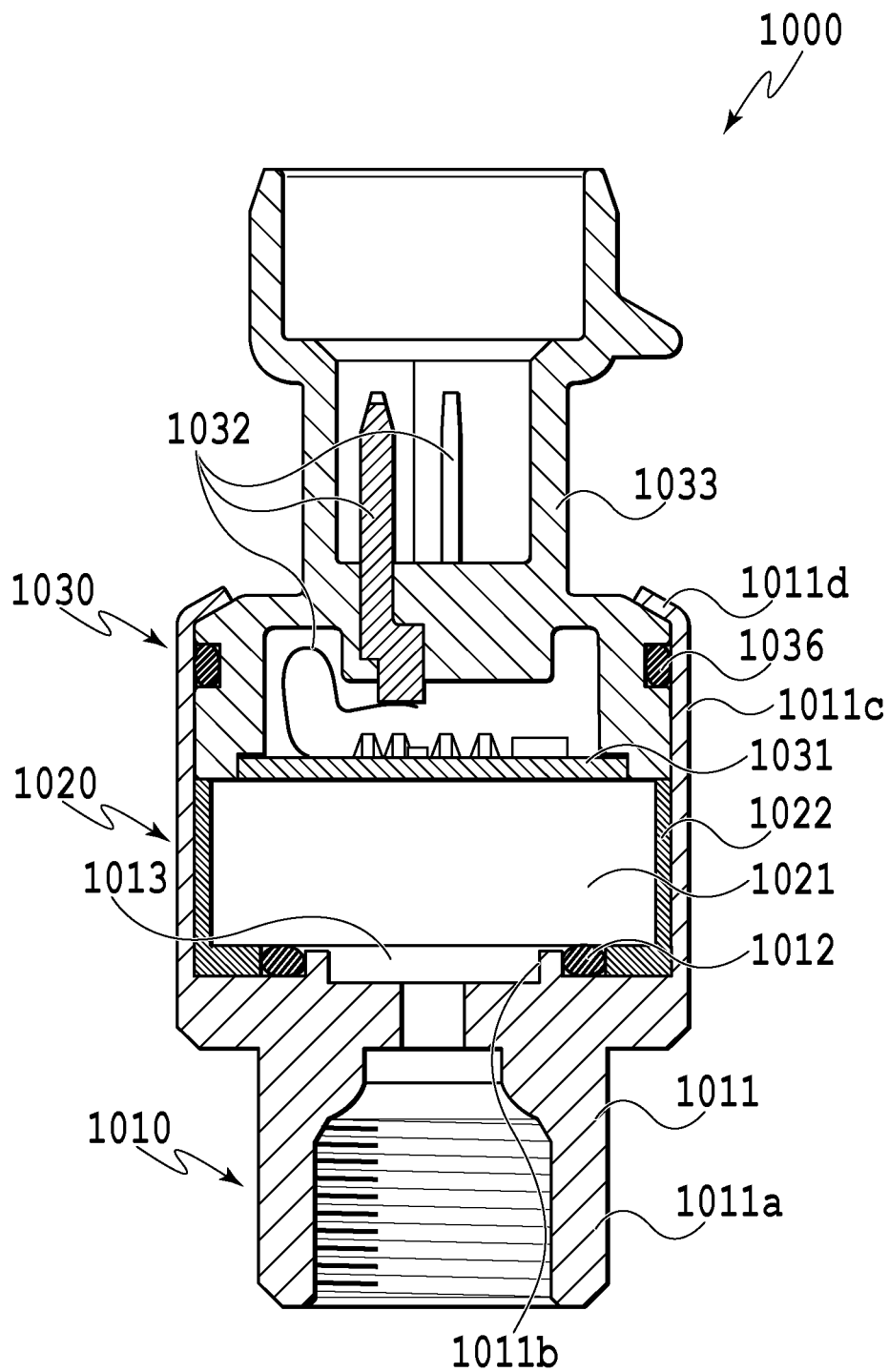
FIG. 10 is a longitudinal sectional view showing a conventional capacitive pressure sensor.

FIG. 8 is a longitudinal sectional view showing an oil-filled pressure sensor 800 as a pressure sensor of the eighth embodiment of the present invention.

In FIG. 8, the pressure sensor 800 is identical to the pressure sensor 100 shown in FIG. 1 except that there is provided a case 835 shaped to cover the periphery of the lower cover 112 and the pressure detection unit 120. The same reference signs are assigned to the same components and description of the components is omitted.

The case 835 is formed of a metal material to have a substantially cylindrical shape. An end of the case 835 on the pressure introducing unit 110 side is provided with a flange portion 835a bent inward. The case 835 is arranged such that the flange portion 835a contacts the lower cover 112 after the lower cover 112 and the metal housing 124 are fixed by welding. The case 835 is fixed by press fitting to prevent sagging of the sealing adhesive 136.

As described above, according to the pressure sensor 800 of the eighth embodiment of the present invention, the same advantageous effect as the pressure sensor 100 of the first embodiment can be produced. In addition, waterproofness can be improved without raising man-hours by providing the case 835 shaped to cover the periphery of the lower cover 112 and the pressure detection unit 120.

As described above, according to the pressure sensor of the present embodiment, waterproofness and airtightness can be improved by using the sealing adhesive without the use of an atmosphere-side O-ring or packing and workability can be improved by filling the sealing adhesive in one direction, that is, from the opening of the protective cover comprising the side wall forming the outer periphery and the bottom on the pressure chamber side of the side wall.

REFERENCE SIGNS LIST 100, 200, 300, 400, 500, 600, 700, 800 pressure sensor
110, 510, 610 pressure introducing unit
111 joint
112 lower cover
113, 513, 613 pressure chamber
120, 520, 620 pressure detection unit
121 semiconductor sensor chip
122 liquid seal chamber
123 diaphragm
124 housing
130, 230, 330, 430, 530, 630, 730, 830 signal transmission unit
131, 531, 731, 831 connection substrate
132, 532 electric connector
133, 433, 533 cable
134 spacer
135, 235, 335, 735, 835 case
135A, 235A, 335A, 511A, 611A, 738b, 835A opening
136, 536, 737 sealing adhesive
235a narrowed portion
335a widened portion
433a solder joint
511, 611 protective cover
511a, 611a joint portion
511b, 611b pressure chamber recessed portion
511c, 611c case portion
511d swaging portion
512, 612 O-ring
521, 621 sensor element
522, 622 insulating spacer
534 swaging spacer
735a swaging portion
738 inner cap
738a inner cavity
835a flange portion

The invention claimed is:

1. A pressure sensor comprising:
a joint portion comprising a pressure chamber and a flow path into which fluid is introduced from piping;
a pressure detection unit configured to detect pressure of the fluid introduced into the pressure chamber;
a case which has a cylindrical shape and is arranged on a side of the pressure detection unit opposite to the pressure chamber; and
a signal transmission unit which is arranged inside the case and comprises a cable configured to externally transmit a pressure signal,
wherein a protective cover is formed by any combination of the joint portion, the pressure detection unit, and the case, the protective cover comprising a side wall forming an outer periphery, a bottom on a pressure chamber side of the side wall, and an opening on a side opposite to the bottom,
the opening of the protective cover is filled with a sealing adhesive,
the pressure detection unit includes a metal housing,
the case is formed of a metal material,
the metal housing and the case are substantially equal in diameter, and
the metal housing of the pressure detection unit and the case are connected to each other by welding,
before the sealing adhesive is filled, a connection substrate that electrically connects the cable and the pressure detection unit and a spacer formed by an insulating material are provided inside of the opening of the protective cover, and
the metal housing, the spacer, and the connection substrate are arranged in the order described, and the spacer secures insulation between the metal housing and the connection board.

2. The pressure sensor according to claim 1, wherein
an inner cap is further provided inside of the opening of the protective cover, the inner cap is formed of an insulating material, and the inner cap is formed with, an inner cavity formed on the pressure detection unit side, and an opening formed between the inner cavity and the outside,
the sealing adhesive is filled inside of the inner cap.

\* \* \* \* \*